UNITED STATES PATENT OFFICE.

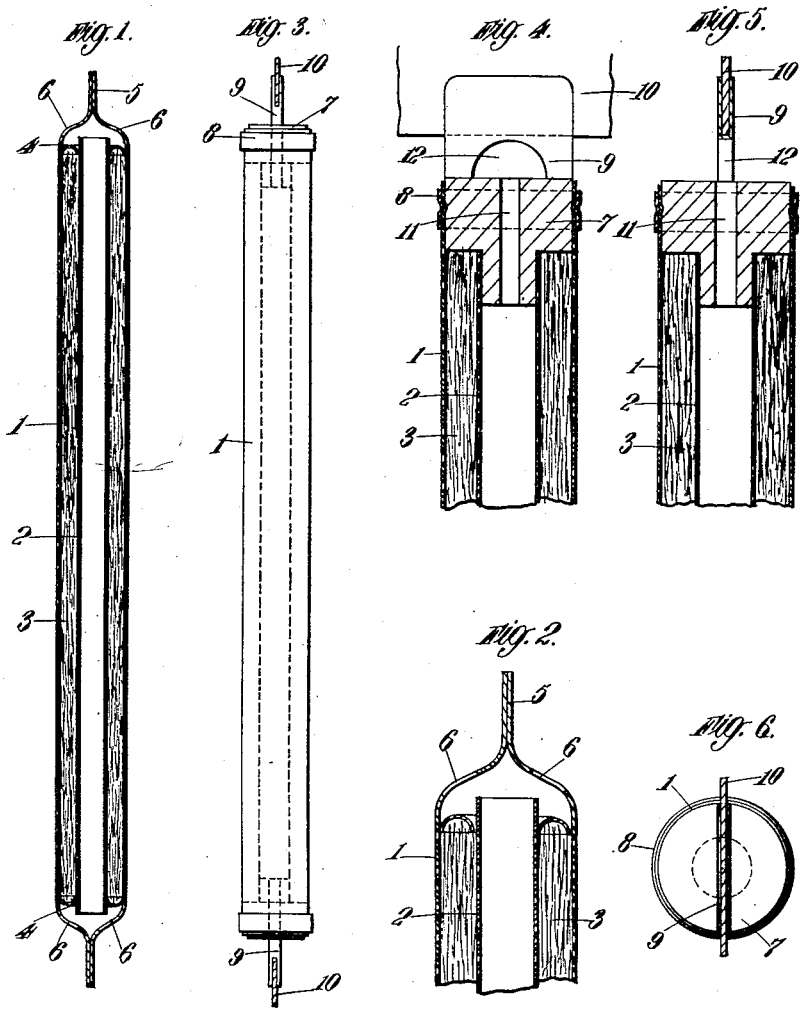

ROBERT SAVILLE, OF BURRAS HILL, OTLEY, ENGLAND.

ELECTRODE FOR STORAGE BATTERIES.

1,354,513.   Specification of Letters Patent.   Patented Oct. 5, 1920.

Application filed September 29, 1917. Serial No. 193,877.

*To all whom it may concern:*

Be it known that I, ROBERT SAVILLE, a subject of the King of Great Britain, residing at Burras Hill, Otley, in the county of York, England, have invented certain new and useful Improvements in Electrodes for Storage Batteries, of which the following is a specification.

This invention relates to electrodes for storage batteries of the kind in which there are employed an alkaline electrolyte and electrodes consisting of perforated tubular parts containing active material, these tubular parts being mounted in a grid or frame.

With electrodes of the kind referred to, and as hitherto constructed, it frequently happens that owing to the packing of the active material in the perforated metal tubes, the electrolyte does not percolate completely through the active material. The chief object of the present invention is to provide an electrode wherein a greater surface of the active material will be exposed to and acted on by the electrolyte.

According to this invention an electrode part arranged to be mounted in a grid or the like and to be employed in a storage battery of the kind in which an alkaline electrolyte is employed, consists of two concentric metal tubes between which active material is placed, both tubes being perforated so that the electrolyte has access to the active material through the perforations of both tubes.

In order that the invention may be fully understood and readily carried into effect the same will now be more fully described with reference to the accompanying drawings, in which:—

Figure 1 is a section of one of the electrode parts constructed according to this invention.

Fig. 2 is an enlarged view in section of one end of the same.

Fig. 3 is an elevation of an electrode part constructed according to this invention and showing an alternative method of closing the ends.

Figs. 4 and 5 are views of one of the ends of the same, the two views being sections taken at right angles.

Fig. 6 is a plan of the top of the same.

Referring to Figs. 1 and 2 the electrode part comprises two concentric metal tubes 1 and 2. Both of the tubes are perforated as shown. The active material 3 is inserted in the space between the two tubes, the ends of the annular space being closed by cup rings 4. The ends of the outer tube 1 are clenched together as shown at 5. Openings are provided at 6 in the tube 1 to allow the electrolyte to obtain direct access to the tube 2. The electrode parts thus formed are supported in a grid by the clenched ends 5 in the ordinary way. The electrolyte obtains access to the active material through the openings 6 in the tube 1 and the perforations in the tube 2 as well as through the perforations in the tube 1.

The tubes 1 and 2 may be made of steel or iron sheet nickeled or otherwise treated to preserve them. The active material may consist of nickel or iron or compounds of the same for example, nickel hydrate.

The ends of the annular space between the two tubes 1 and 2 may be closed and the electrode part mounted in the electrode grid in any other suitable way. One alternative arrangement is shown in Figs. 3 to 6. A head or plug 7 has portions of different diameters to fit in the ends of the tubes 1 and 2 as shown and is fastened in the tube 1 by a clench ring 8. A part 9 projecting from the plug 7 is provided with a slot into which the part 10 of the grid can enter. A passage 11 formed through the plug and an opening 12 in the part 9 permit of the electrolyte obtaining access to the tube 2.

What I claim and desire to secure by Letters Patent of the United States is:—

1. An electrode for storage batteries of the kind in which an alkaline electrolyte is employed, comprising outer and inner metal tubes arranged concentrically and providing an annular space between them to receive a filling of active material, both tubes having perforations to permit the electrolyte to pass therethrough and percolate through the active material; and means at each end of the electrode for closing the adjacent end of said annular space and for direct connection to a grid or frame wherein the electrode is supported, at least one of said means being formed with openings to permit the electrolyte to pass directly into the inner tube.

2. An electrode for storage batteries of the kind in which an alkaline electrolyte is employed, comprising outer and inner metal tubes disposed concentrically and providing an annular space between them to receive a filling of active material, the outer tube projecting beyond the inner tube at opposite ends and both tubes having perforations to permit the electrolyte to pass therethrough and percolate through the active material; and a plug at each end of the electrode for closing the adjacent end of said annular space and for attaching the electrode to a grid or frame, each plug having a portion which fits in the projecting end of the outer tube and a reduced portion which fits in the adjacent end of the inner tube, and at least one plug having an open ended passage formed through it to permit the electrolyte to pass directly into said inner tube.

3. An electrode for storage batteries of the kind in which an alkaline electrolyte is employed, comprising outer and inner metal tubes disposed concentrically and providing an annular space between them to receive a filling of active material, the outer tube projecting beyond the inner tube at opposite ends and both tubes having perforations to permit the electrolyte to pass therethrough and percolate through the active material; a plug at each end of the electrode for closing the adjacent end of said annular space, each plug having a portion which fits in the projecting end of the outer tube and a reduced portion which fits in the adjacent end of the inner tube, and at least one plug having an open-ended passage formed through it to permit the electrolyte to pass directly into said inner tube; and a member projecting from the first-named portion of each plug for directly attaching the adjacent end of the electrode to a grid or frame, said member having a slot to receive the adjacent part of the grid and also having an opening which registers with the passage in the plug.

In testimony whereof I affix my signature.

ROBERT SAVILLE.